United States Patent [19]
Ohtawa et al.
[11] Patent Number: 4,470,743
[45] Date of Patent: Sep. 11, 1984

[54] CONTAINER

[75] Inventors: Kimiaki Ohtawa; Yasuo Fukada, both of Hiroshima, Japan
[73] Assignee: Mitsubishi Jukogyo Kabushiki Kaisha, Tokyo, Japan

[21] Appl. No.: 256,240
[22] Filed: Apr. 21, 1981

[30] Foreign Application Priority Data
Jun. 26, 1980 [JP] Japan .................................... 55-5843

[51] Int. Cl.$^3$ ............................................ B65G 47/00
[52] U.S. Cl. .................................................... 414/420
[58] Field of Search ............... 414/192, 199, 204, 185, 414/420, 422, 403; 294/68.26, 68.25; 141/91; 222/148, 503; 15/406

[56] References Cited

U.S. PATENT DOCUMENTS 1,794,714 3/1931 Kiplinger ........................... 414/403
2,932,435 4/1960 Godwin ............................ 222/503
2,956,833 10/1960 Morin .............................. 294/68.25
3,089,725 5/1963 Bertels ............................ 294/68.26
4,135,569 1/1979 Drobnik et al. ............... 222/148 X

FOREIGN PATENT DOCUMENTS 104910 9/1938 Australia .
248656 8/1960 Australia .
425016 1/1968 Australia .
519784 1/1977 Australia .
3115275 3/1982 Fed. Rep. of Germany .
55-117992 9/1980 Japan .
1139765 1/1969 United Kingdom .
2076511 12/1981 United Kingdom .

OTHER PUBLICATIONS

"The Making, Shaping and Treating of Steel", 8th Ed. 1964, pp. 409, 464 & 523.

*Primary Examiner*—Jeffrey V. Nase
*Attorney, Agent, or Firm*—Wenderoth, Lind & Ponack

[57] ABSTRACT

A container for conveying a pulverized or granular material includes a bottomed container vessel adapted to be rotated upside down and having an upwardly narrowing tapered section in its upper portion, an opening section formed above the tapered section, and a valve for blocking the flow of pulverized or granular material through the opening section provided within the opening section. The pulverized or granular material can be charged into the container vessel through the opening section while the container vessel is held in a normal upright condition, and the pulverized or granular material can be discharged from the container vessel through the opening section while the container vessel is held upside-down.

2 Claims, 4 Drawing Figures

CONTAINER

BACKGROUND OF THE INVENTION

The present invention relates to a container for conveying a pulverized or granular material.

Heretofore, a container for conveying reduced iron as shown in FIG. 1 has been known. This container has such structure that a charging port 02 is provided at the top of a container vessel 01, a discharging port 03 is provided at the bottom thereof, and the charging port 02 and discharging port 03 are adapted to be opened and closed by means of a vertically movable charging bell 04 and a discharging bell 05, respectively. Reference numeral 06 designates a drive rod for the charging bell 04, numeral 07 designates a drive rod for the discharging bell 05, and these drive rods have a double-shaft structure.

It is to be noted that reduced iron is liable to be oxidized and if it should be oxidized its commercial value would be lost. Especially, in the case where a so-called hot discharge is employed in which reduced iron is extracted under a high-temperature condition from a shaft furnace, the activity of air on the reduced iron is high, and hence the reduced iron is even more liable to be oxidized. Accordingly, in the event of conveying reduced iron, provision must be made such that contact between the reduced iron and air may be minimized.

However, the above-mentioned heretofore known container has a shortcoming that due to the existence of two opening sections for charging and for discharging, the reduced iron was apt to come into contact with air. Moreover, the heretofore known container also has a shortcoming that due to the double shaft structure of the opening/closing mechanism for the opening sections, the structure of the container is complex.

SUMMARY OF THE INVENTION

It is therefore the object of the present invention to provide a container for conveying a pulverized or granular material, in which entrance of air into the container is minimized, and also the structure of which is simplified.

According to one feature of the present invention, there is provided a container for conveying a pulverized or granular material comprising a bottomed container vessel adapted to be rotated upside down, an upwardly narrowing tapered section in the upper portion of the container vessel, and an opening section formed above the tapered section and provided with a valve therein. The pulverized or granular material can be charged into the container vessel through the opening section while the container vessel is held in a normal upright condition, and the pulverized or granular material can be discharged from the container vessel through the opening section while the container vessel is held upside-down.

BRIEF DESCRIPTION OF THE DRAWINGS

The above-mentioned and other features and objects of the present invention will become more apparent by reference to the following description of a preferred embodiment of the invention taken in conjunction with the accompanying drawings, wherein.

DETAILED DESCRIPTION OF THE INVENTION

Figure 1:
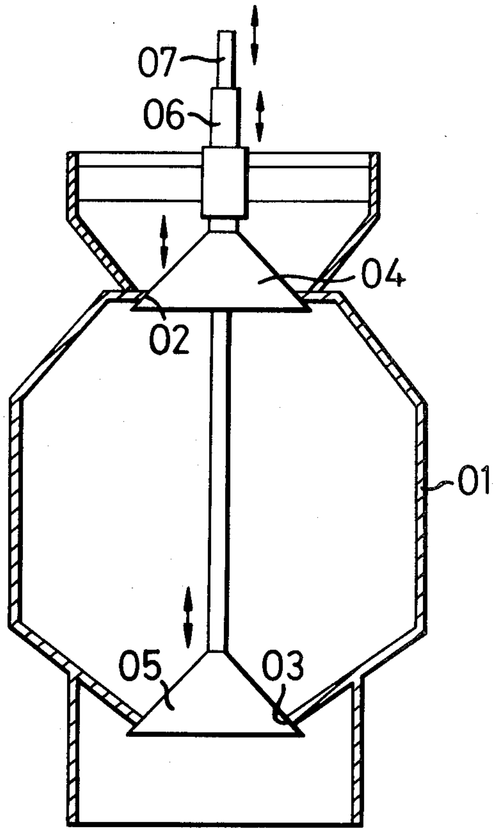
FIG. 1 PRIOR ART
FIG. 1 is a longitudinal cross-section view of a heretofore known container, FIGS. 2(*a*) and 2(*b*) are a plan view and a front view, respectively, of one preferred embodiment of a container according to the present invention.
Figure 2A:
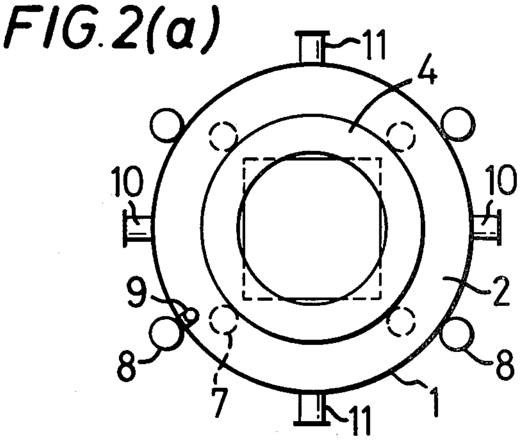
Figure 2B:
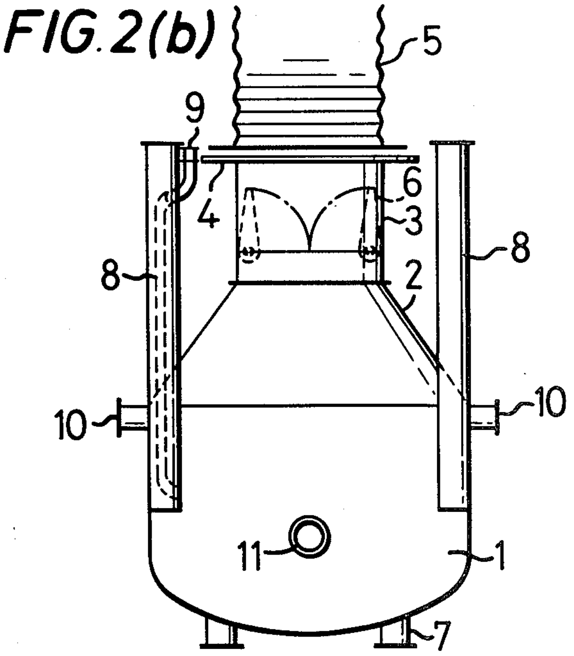

Referring now to FIGS. 2(*a*) and 2(*b*) which illustrate one preferred embodiment of the container according to the present invention in a normal upright condition, a container vessel 1 is a bottomed vessel, i.e. with a closed first end an upwardly narrowing tapered section 2 is provided in the upper portion or second end of the container vessel 1, and an opening section 3 which serves as a charging port and also as a discharging port is formed above the tapered section 2. At the outer end of the opening section 3 is provided a flange 4, so that a port of charging means of a pulverized or granular material or discharging means of a pulverized or granular material can be connected to the opening section 3 by making use of the flange 4. In FIGS. 2(*b*) and 3, the opening section 3 is shown connected via the flange 4 to a bellows type of compensator 5 which is in turn connected to a shaft furnace 12. Within the opening section 3 is provided a double door or pivotable flap type valve 6, which can be opened and closed and the extent of opening of which can be regulated by driving manipulations on the outside of the container vessel 1. Various other types of valves can be employed besides the double door type valve 6, and in essence, it is only necessary that the valve can block a flow of a pulverized or granular material and can regulate its flow rate when it is discharged.

At the bottom of the container vessel 1 are provided four normal-standing support legs 7 for holding the container vessel 1 in a normal upright condition. In addition, on the side surface of the container vessel 1 are provided four upside-down-standing support legs 8 extending higher than the outer end of the opening section 3. When the container vessel 1 stands upside down, the container vessel 1 is held upside-down by these support legs 8. On one of the upside-down-standing support legs 8 is provided a blast port 9 of a gas (an inert gas or $N_2$ gas) for purging the interior of the container vessel 1. A purging gas enters from the blast port 9 through a passageway within the leg 8 into the container vessel 1. Trunnions 10 for suspending the container vessel 1 when it stands normally are provided at two diametrically opposed positions on the side surface of the container vessel 1 near to its upper end, and also trunnions 11 for suspending the container vessel 1 when it stands upside down are provided at two diametrically opposed positions on the side surface of the container vessel 1 near to its lower end as seen in FIG. 2(*b*). In the illustrated embodiment, the trunnions 10 and the trunnions 11 are disposed at perpendicular positions with respect to each other. If it becomes necessary to suspend the container when it stands normally or when it stands upside down, then a lifting machine such as a crane or the like is connected to the trunnions 10 or to the trunnions 11, respectively. It is to be noted that the inner wall surface of the container vessel 1 could be applied with a refractory lining to make the wall of the container vessel 1 heatresistive.

Transportation of a pulverized or granular material (in the illustrated embodiment, high-temperature reduced iron) by making use of a container having the above-described structure, now will be explained with reference to FIG. 3.

Figure 3:
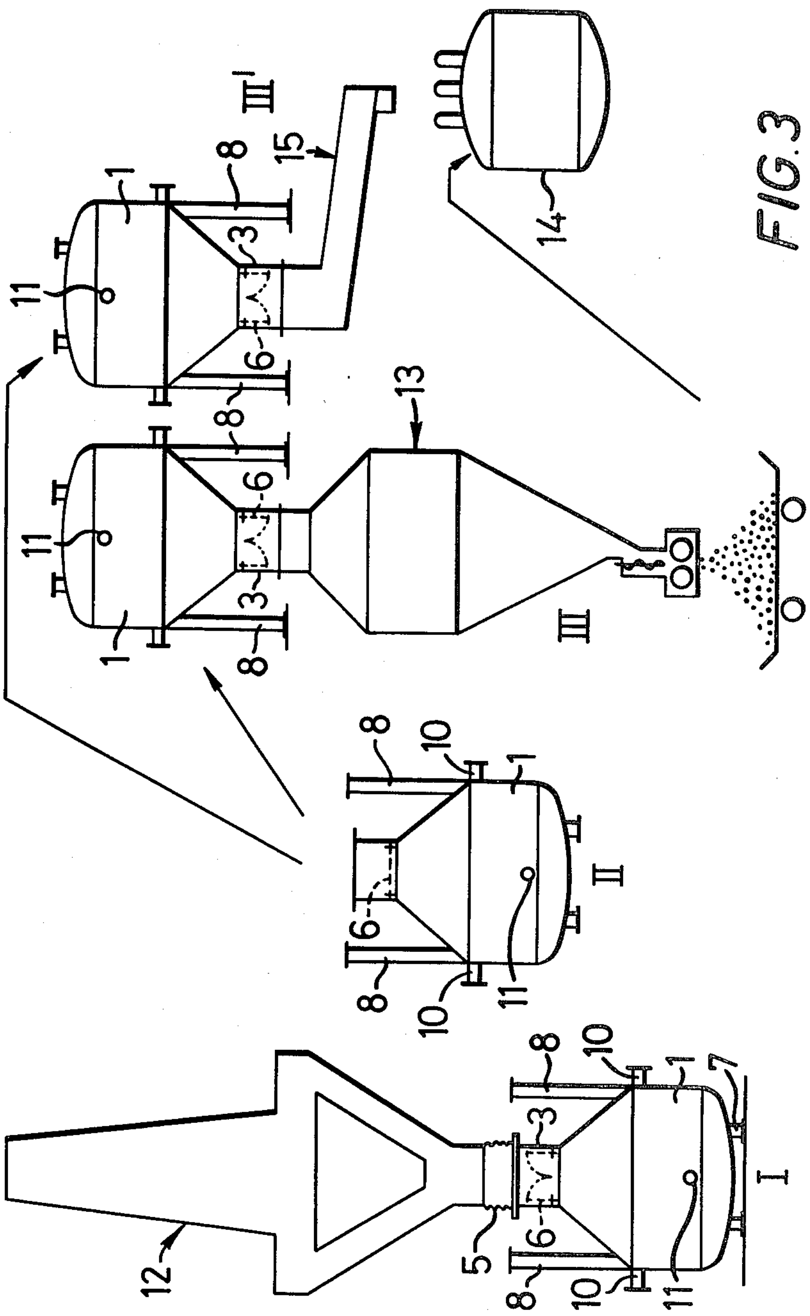
FIG. 3 is a schematic view explanatory of a process for conveying a pulverized or granular material by means of the container illustrated in FIGS. 2(*a*) and 2(*b*).

A container is disposed at a predetermined position such as, for instance, under a shaft furnace 12, a compensator 5 on the side of the shaft furnace 12 is extended so as to butt against the opening section 3 of the container, and thereby the container and the shaft furnace 12 are connected with each other as shown at I in FIG. 3. A purging gas is blasted into the container vessel through the blast port 9 to purge the interior of the container vessel 1, and thereby air within the container vessel 1 can be discharged. After the purge has been completed, high-temperature reduced iron is charged from the shaft furnace 12 into the container vessel 1. After completion of the charging, the compensator 5 is separated from the opening section 3, at the same time the double door type valve 6 is closed, and then the container is conveyed or moved. During transportation, although it is difficult for the double door type valve 6 to perfectly seal a gas in view of the nature of the valve 6 which also serves as a valve for blocking a pulverized or granular material, since the opening section 3 of the container is the only opening provided and since high-temperature reduced iron is accommodated in the container, the entrance of external air into the container scarcely will occur. The transportation of the container is achieved by means of a truck or the like, and the container is inverted by 180 degrees by making use of a special inverting mechanism. Then, the inverted container is conveyed by a crane or the like to a briquetting plant 13 as shown at III in FIG. 3, or to a charging installation 15 for an electric furnace 14 to be used for hot-charging as shown at III' in FIG. 3, and the downwardly directed opening section 3 is connected to the port of the installation 13 or 15. At this moment, the container is supported by the upside-down-standing support legs 8. After the connection has been finished, the double door type valve 6 is opened and thereby reduced iron is discharged. The flow rate of discharging of reduced iron is regulated by the valve 6.

In the illustrated example, since a blast port 9 for a purging gas is provided on the container to purge the interior of the container vessel 1 before charging of reduced iron, contact between air and reduced iron can be further precluded.

As described above in connection to one preferred embodiment, in the case of the container according to the present invention, owing to the fact that only one opening section is provided, the entrance of air into the interior of the container can be prevented, and also the structure of the container becomes very simple.

Since many changes could be made to the above construction and many apparently widely different embodiments of this invention could be made without departing the scope thereof, it is intended that all matter contained in the above description or shown in the accompanying drawings shall be interpreted as illustrative and not as a limitation to the scope of the invention.

What is claimed is:

1. A container for conveying a pulverized or granular material, said container comprising:

a vessel including a closed first end, an outwardly narrowing tapered section extending from a second end opposite said first end, and an opening section extending outwardly from said tapered section and having an opening into the interior of said vessel, said vessel adapted to be inverted between a normal upright position, with said opening section directed upwardly and an upside-down position with said opening section directed downwardly;

pivotable valve means, positioned within said opening section, for selectively opening and closing said opening by a regulated amount, to enable charging of pulverized or granular material into said vessel when said vessel is in said normal upright position, and to enable discharging of said material from said vessel when said vessel is in said upside-down position;

first support legs extending from said first end of said vessel for supporting said vessel when in said normal upright position;

second support legs extending from said second end of said vessel for supporting said vessel when in said upside-down position, said second support legs extending outwardly beyond said opening section and beyond said valve means when in the opened position thereof; and port means, separate from and independent of said opening, for introducing a purge gas into said interior of said vessel, said port means including a passage extending through one of said second support legs.

2. A container as claimed in claim 1, wherein said valve means comprises a pair of flaps pivotally mounted within said opening section.

* * * * *